(12) United States Patent
Wald et al.

(10) Patent No.: US 11,668,916 B2
(45) Date of Patent: Jun. 6, 2023

(54) BEAM MANIPULATION DEVICE FOR A SCANNING MICROSCOPE, AND MICROSCOPE

(71) Applicant: Carl Zeiss Microscopy GmbH, Jena (DE)

(72) Inventors: Matthias Wald, Jena (DE); Tiemo Anhut, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 237 days.

(21) Appl. No.: 16/342,613

(22) PCT Filed: Oct. 16, 2017

(86) PCT No.: PCT/EP2017/076337
§ 371 (c)(1),
(2) Date: Apr. 17, 2019

(87) PCT Pub. No.: WO2018/073170
PCT Pub. Date: Apr. 26, 2018

(65) Prior Publication Data
US 2019/0265455 A1    Aug. 29, 2019

(30) Foreign Application Priority Data
Oct. 17, 2016    (DE) .......................... 102016119727.0

(51) Int. Cl.
*G02B 21/00* (2006.01)
*G02B 21/36* (2006.01)
*G02B 26/08* (2006.01)

(52) U.S. Cl.
CPC ..... *G02B 21/0032* (2013.01); *G02B 21/0048* (2013.01); *G02B 21/0072* (2013.01);
(Continued)

(58) Field of Classification Search
CPC ............ G02B 21/0032; G02B 21/0076; G02B 21/002; G02B 21/008; G02B 21/06;
(Continued)

(56) References Cited

U.S. PATENT DOCUMENTS 3,658,405 A    4/1972    Pluta
5,825,533 A    10/1998   Yonezawa
(Continued)

FOREIGN PATENT DOCUMENTS

CN     1759307 A    4/2006
CN     101019018 A  8/2007
(Continued)

OTHER PUBLICATIONS

English Translation of DE 1020140170003 (Year: 2021).*
(Continued)

*Primary Examiner* — Christopher Stanford
(74) *Attorney, Agent, or Firm* — LaBatt, LLC

(57) ABSTRACT

The invention relates to a beam manipulation device for a scanning microscope, comprising a main colour splitter for coupling excitation light into an illumination beam path and for separating excitation light from detection light of a detection beam path, said device comprising a scanner, preferably positioned on a pupil plane, for scanning the excitation light. The device is characterised in that: an additional optical section is provided comprising optical elements which influence a beam path; at least one pupil plane and/or at least one intermediate image plane is formed in the additional optical section by the optical elements which influence the beam path; and an adjustable selection device is provided for activating either a first beam segment of the illumination and/or detection beam path, or the additional optical section, wherein the first beam segment of
(Continued)

Figure 1:
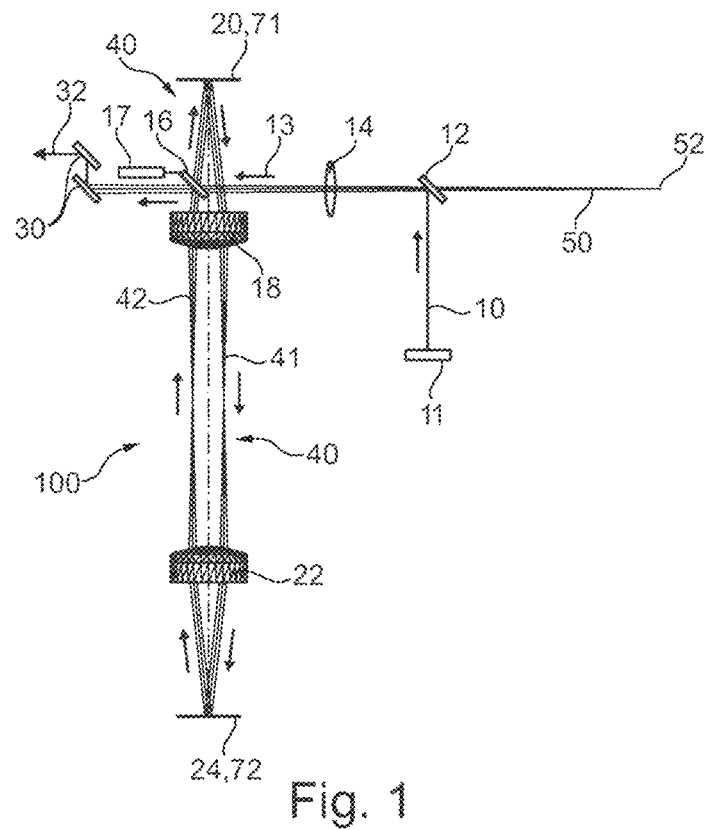

the illumination and/or detection beam path does not contain a pupil plane of the illumination and/or detection beam path.

32 Claims, 3 Drawing Sheets

(52) U.S. Cl.
CPC .......... *G02B 21/361* (2013.01); *G02B 21/006* (2013.01); *G02B 21/0068* (2013.01); *G02B 21/0076* (2013.01); *G02B 26/0816* (2013.01)

(58) Field of Classification Search
CPC ............ G02B 21/0048; G02B 21/0056; G02B 21/0068; G02B 21/0072; G02B 21/361; G02B 21/0024; G02B 21/0036; G02B 21/0052

See application file for complete search history.

(56) References Cited

U.S. PATENT DOCUMENTS

| | | | |
|---|---|---|---|
| 6,075,643 A | 6/2000 | Nonoda et al. | |
| 6,979,830 B2 | 12/2005 | Dietz et al. | |
| 7,583,380 B2 | 9/2009 | Van Beek et al. | |
| 7,884,337 B2 | 2/2011 | Hasegawa et al. | |
| 8,013,313 B2 | 9/2011 | Erlbacher et al. | |
| 8,208,202 B2 | 6/2012 | Sase | |
| 8,699,132 B2 * | 4/2014 | Iketaki | G01N 21/6458 359/385 |
| 9,069,167 B2 * | 6/2015 | Nishiwaki | G02B 21/06 |
| 9,158,100 B2 * | 10/2015 | Yokoi | G02B 21/06 |
| 9,778,177 B2 * | 10/2017 | Roke | G01N 21/636 |
| 9,778,573 B2 * | 10/2017 | Tang | G03B 21/005 |
| 10,133,046 B2 | 11/2018 | Kalkbrennar et al. | |
| 10,261,300 B2 | 4/2019 | Lippert et al. | |
| 10,281,698 B2 * | 5/2019 | Singer | G02B 21/008 |
| 10,545,324 B2 * | 1/2020 | Honda | G02F 1/0102 |
| 10,802,259 B2 * | 10/2020 | Ouchi | G02B 21/0032 |
| 2007/0081233 A1 | 4/2007 | Hattori | |
| 2015/0077844 A1 * | 3/2015 | Singer | G02B 21/0032 359/385 |
| 2016/0131881 A1 | 5/2016 | Boehme et al. | |

FOREIGN PATENT DOCUMENTS

| | | | | |
|---|---|---|---|---|
| CN | 101583895 A | 11/2009 | | |
| CN | 104303089 A | 1/2015 | | |
| CN | 104991337 A | 10/2015 | | |
| DE | 102006045839 A1 * | 4/2008 | ......... | G02B 21/0032 |
| DE | 102006045839 A1 | 4/2008 | | |
| DE | 102012017922 A1 | 5/2014 | | |
| DE | 102013218795 A1 | 3/2015 | | |
| DE | 102014017002 A1 | 5/2016 | | |
| DE | 102014017003 A1 * | 5/2016 | ......... | G02B 21/0032 |
| DE | 102014017003 A1 | 5/2016 | | |
| EP | 3153906 A1 * | 4/2017 | ......... | G01N 21/6458 |
| JP | H8320436 A | 9/1995 | | |
| JP | H11-223773 B2 | 8/1999 | | |
| JP | 2002523731 A | 7/2002 | | |
| JP | 2009104136 A | 5/2009 | | |
| JP | 2014232286 A | 12/2014 | | |
| JP | 2015527618 A | 9/2015 | | |
| JP | 2016133668 A | 7/2016 | | |
| JP | 2016532883 A | 10/2016 | | |
| WO | 2015039806 A1 | 3/2015 | | |

OTHER PUBLICATIONS

Yang, Jing and Yi Han, CN Application No. 201780064240.X, Office Action, dated Mar. 1, 2021, 19 pages (english translation).
International Search Report and Written Opinion for International Application No. PCT/EP2017/076337 (no English translation available), dated May 4, 2018, 13 pages.
International Search Report and Written Opinion for International Application No. PCT/EP2017/076337 (With English translation),dated Apr. 23, 2019, 22 pages.
German Application No. DE1779168.6, Search Report and Written Opinion (English Translation not Available), dated May 17, 2017, 10 pages.
Kurata, Atsuyuki, JP Application No. 209-520581, Office Action 1, dated Oct. 25, 2021, received Nov. 22, 2021, 15 pages (Machine English translation provided).
Yang, Jing and Yi Han, CN Application No. 201780064240.X, Office Action2, dated Jan. 20, 2022, 12 pages (english translation).

* cited by examiner though the surroundings need not be. Reshaping the laser beam, for example, into a line or a plurality of points is possible. Further, beam influencing that changes the point spread function (PSF) in a targeted fashion is important. Here, reshaping into so-called "doughnut PSFs", Bessel PSFs or helical PSFs is possible, for example.

BEAM MANIPULATION DEVICE FOR A SCANNING MICROSCOPE, AND MICROSCOPE

The present invention relates in a first aspect to an apparatus for beam manipulation for a scanning microscope according to the preamble of claim 1. In a second aspect, the invention relates to a microscope.

A generic apparatus is described in DE 10 2014 017 003 A1 and said apparatus comprises the following components: a principal color splitter for coupling excitation light into an illumination beam path and for separating excitation light from detection light of a detection beam path and a scanner, preferably positioned in a pupil plane, for scanning the excitation light.

In laser scanning microscopy, there is the need for manipulating the pupil in the stationary beam. Using this, it is possible to realize three-dimensional scanning paths; spatially dependent faults of the sample can be corrected and further manipulations can be undertaken in relation to the illumination and detection light, both together and separately. In particular, the aspect of beam shaping is also very important in this case. Thus, it may be advantageous to reshape a Gaussian laser beam, for example into a line or plurality of points. Furthermore, beam influencing that changes the point spread function (PSF) in a targeted fashion is important. Here, reshaping into so-called "doughnut PSFs", Bessel PSFs or helical PSFs is possible, for example.

DE 10 2014 017 003 A1 describes an option for manipulating a pupil where necessary in a separate optical path using an adaptive mirror. However, the optical unit that can be added there requires a freely accessible pupil plane, which must be always kept available.

DE 10 2006 045 839 A1 likewise describes an option for manipulation in a pupil plane. However, the required optical unit is not addable or deactivatable in that case. It is always required in the beam path.

It may be considered to be an object of the invention to develop a light-efficient and compact apparatus for beam manipulation, which can be used in particularly multifaceted fashion.

This object is achieved by means of the apparatus having the features of claim 1. According to the invention, the apparatus of the type set forth above is developed in that an additional optical section is present, said optical section comprising optical elements that influence a beam path, in that at least one pupil plane and/or at least one intermediate image plane is formed in the additional optical section by way of the optical elements that influence the beam path, in that an adjustable selection device is present for activating either a first beam portion of the illumination and/or detection beam path or the additional optical section, wherein the first beam portion of the illumination and/or detection beam path contains no pupil plane of the illumination and/or detection beam path.

The apparatus according to the invention is particularly suitable for a confocal scanning microscope and/or for a laser scanning microscope.

Moreover, a microscope comprising an apparatus for beam manipulation according to the invention is claimed, said microscope moreover comprising at least the following constituent parts: at least one microscope objective and a detector device for detecting detection light emitted by a sample, wherein the pupil planes of the additional optical section are situated in planes that are optically conjugate to a pupil plane of the microscope objective.

A core concept of the invention can be considered that of the additional optical section being designed in such a way that, in principle, it can be inserted at any point in the illumination beam path or detection beam path of a microscope.

The essential idea of the invention, which relates to the positioning of the selection device, can also be described by virtue of the selection device being positioned outside of pupil planes of the stationary or de-scanned illumination or detection beam path. By means of the selection device, either the additional optical section or a first beam portion of the illumination and/or detection beam path is activated. Activation means that the respective part of the beam path is passed through by illumination and/or detection light in the activated state and correspondingly not passed through by illumination and/or detection light in the non-activated state.

As a result of the variable provision of at least one further pupil plane or at least one further intermediate image plane, elements for manipulating the wavefront of the light, for example adaptive elements and, in particular, reflective adaptive elements, can be used very conveniently, depending on the application.

Specifically, if the additional optical section is activated, the illumination and/or detection beam path extends precisely over this additional optical section and the additional pupil or the additional pupils or intermediate image planes. Then, no illumination and/or detection light passes through the first beam portion. In the other case, illumination and/or detection light passes through or over the first beam portion when the latter is activated, and no light then passes along the additional optical section. What is essential to the invention is that the optical section, specifically the first beam portion of the illumination and/or detection beam path, which is replaced by the additional optical section when the latter is activated, has no pupil.

In contrast to DE 10 2014 017 003 A1, the solution according to the invention is therefore usable independently of whether or not a freely accessible pupil plane is present on the respective microscope beam path. Therefore, the apparatus according to the invention is usable in a particularly multifaceted manner, particularly even in already existing microscopes, without a freely accessible pupil plane having to be kept available.

A further advantage of the invention lies in the fact that the optical unit outlay can be kept comparatively low, especially in the detection beam path. This is particularly important for fluorescence microscopy, in particular, because the photons available there have to be detected as efficiently as possible. Therefore, the beam path should always contain only as many optical elements as are required for the currently employed functionality. This is provided by the invention.

Thus, the invention provides a comparatively simple optical unit, by means of which a pupil intervention and/or an intermediate image intervention can be added in a stationary beam of a microscope, in particular of a laser scanning microscope. Here, no unnecessary optical elements remain in the beam path when the pupil intervention and/or intermediate image intervention is deactivated. Moreover, in the apparatus according to the invention it is possible, as a matter of principle, that only the excitation light or the detection light is selectively influenced.

The apparatus according to the invention can be part of a laser scanning microscope, in particular a confocal laser scanning microscope, where it can be arranged between scanning device on the one hand and principal color splitters, laser source and, optionally, a pinhole on the other hand.

Within the scope of this description, pupil planes refer to planes that, in an operational state of the apparatus according to the invention, are optically conjugate to a back focal plane of a microscope objective currently in use. Accordingly, intermediate image planes within the scope of this description refer to those planes that are optically conjugate to a focal plane of a microscope objective currently in use, thus, as a rule, optically conjugate to an object plane when, specifically, an object is positioned in the focal plane.

The selection device can also be referred to as a switchable element. The scanning device may have a mirror that is swivelable about two axes. Such devices are known. In place of a single scanning mirror, a plurality of scanning mirrors could also be present in conjugate planes and could set a position, which is then imaged into the pupil plane by a lens optical unit.

The additional optical section is also referred to as wavefront manipulation path and also referred to as adaptive path if adaptive elements for influencing the wavefront are used.

The term light, in particular illumination light or detection light, is understood to mean electromagnetic radiation, as is typically used, or as typically occurs, in microscopy. The illumination light, which can in particular be in the infrared, visible or ultraviolet spectral range, is typically provided by lasers. The microscope according to the invention is preferably a laser scanning microscope. The terms scanning and rastering are used synonymously in this description.

Devices that are positioned in an intermediate image plane and/or pupil plane of the additional optical section and that serve to manipulate the light, in particular in respect of its spatial distribution of the intensity and/or the phase, are also referred to as manipulation elements within the scope of this description.

The invention also includes the out-coupling and deflecting of the detection beam path instead of the excitation beam path, and the influencing thereof by at least one adaptive optical element in an additional pupil plane.

Preferred configurations of the detection apparatus according to the invention as well as advantageous variants of the method according to the invention and of the microscope according to the invention are described below, in particular with reference to the dependent claims and the figures.

For reasons of structural conditions, the selection device in a first preferred variant of the apparatus according to the invention may be positioned, for example, in a collimated region of the illumination and/or detection beam path. Then, the first beam portion is a portion of the collimated region of the illumination and/or detection beam path.

A substantial advantage of the apparatus according to the invention is that it can be positioned very flexibly. This means that preference may be given in certain arrangements to the selection device being positioned in a divergent or convergent region of the illumination and/or detection beam path due to the available installation space. Then, the first beam portion is a portion of a divergent or convergent region of the illumination and/or detection beam path.

Although it is preferable to influence the illumination and/or detection beam path in a pupil plane or an intermediate image plane, it is possible, in principle, to influence any optical planes, i.e., also planes between a pupil plane and an image or intermediate image plane.

What is important in view of the actuation of the selection element is that the light is deflected as desired. Therefore, in principle, the selection device can be any type of beam-deflecting device that is suitable for switching between beam paths. In principle, use can also be made here of electro-optic components.

Particularly preferably, mechanical means are present for pivoting the selection device into and out of the illumination and/or detection beam path and/or for pushing said selection device into or out of said illumination and/or detection beam path.

Particularly preferably, the selection device has a mirror, in particular a double mirror. In particular, the mirror or double mirror can be adjustable, for example movable into the beam path or movable out of said beam path. This variant has a simple construction and operates reliably. By way of example, the mirror can be pivotable and/or displaceable.

In particular, both the excitation and the detection light can pass through the additional optical section. This can be advantageous for fast focusing, in particular. If the additional optical section is not required, the selection device is actuated accordingly, i.e., the mirror is simply pivoted out, for example.

In a further preferred variant of the invention, the selection device has at least one color splitter. This selectively allows only excitation light to be influenced in full or in part and/or the detection light to be influenced in full or in part.

By way of example, the selection device may have at least one dichroic beam splitter.

Moreover, exploiting the polarization of the light is advantageous. Thus, by using a polarization-dependent beam splitter, light with a certain polarization can be guided over the arrangement while light with the orthogonal polarization direction does not pass through the apparatus. A property of polarizing layers can be made usable here in a particularly advantageous manner by way of a wavelength-dependent split of the s- and p-components. What this can achieve, for example, is that the excitation light is sent along a respective path, depending on its polarization, while the emission light with a longer wavelength is transmitted through the splitter for both polarization directions.

In this context, a variant of the apparatus according to the invention is particularly preferred, in which variant a switching device for activating and deactivating the illumination light, in particular an acousto-optic or electro-optic switch, such as a Pockels cell, is present in the illumination beam path, in particular upstream of the principal color splitter, and in which variant the adjustable selection device is embodied as a polarization filter with a wavelength-dependent effect.

Moreover, particular advantages are obtained in a further variant of the invention, in which the illumination beam path is subdivided into a plurality of partial beams, in which polarization-rotating elements for providing different polarizations of the partial beams are present in the beam paths of the partial beams, and in which a switching device, in particular a multiple AOTF, is present for switching between one or more of the partial beams.

Thus, a multi-beam arrangement is obtained, in which beams with different polarization are present; this renders it possible to very quickly switch between said beams. By way of example, this can be achieved by virtue of splitting a laser beam in the illumination beam path into a plurality of partial beams and then guiding these partial beams through a multiple AOTF, wherein, for example, a polarization-rotating element, such as a half wavelength plate (lambda/2 plate), is present in the beam path of one of these partial beams. Then, the AOTF allows switching between these differently polarized partial beams, and hence between the manipulated and non-manipulated light patterns in the sample, to be carried out very easily and quickly.

By way of example, one subgroup of the partial beams can be s-polarized and another subgroup can be p-polarized. Then, it is possible to switch between these subgroups, for example using a spatially multichannel acousto-optic filter.

A further advantageous configuration of the apparatus according to the invention is characterized in that the selection device comprises at least one wavelength-dependent dichroic polarization filter.

If the selection device, i.e., the switchable element, has a color splitter or is a color splitter, the excitation light, for example, can be guided over the wavefront manipulation path in order to undertake, for example, specific beam shaping or in order to defocus excitation light in relation to the detection light. By way of example, a longitudinal chromatic aberration correction can be undertaken at 405 nm. The detection light, which has a longer wavelength than the excitation light in the case of fluorescence, passes the color splitter without passing through the adaptive optical unit and can be detected highly efficiently as a result thereof. Furthermore, this arrangement is expedient if the intention is to selectively split the beam into a plurality of partial beams at this point but not to influence the emission light in the process. In this case, a microlens array, for example, could be introduced into the beam downstream of the principal color splitter, said microlens array guiding the emission light, which results from the plurality of focal points, through a pinhole and onto downstream detectors.

A further advantageous variant of the invention is characterized in that the selection device comprises at least one wedge-shaped color splitter, in that a front side of the wedge-shaped color splitter is embodied to reflect light at wavelengths that are longer or shorter than a first limit wavelength and in that a back side of the wedge-shaped color splitter is embodied to reflect light at wavelengths that are longer or shorter than a second limit wavelength. Here, the first limit wavelength and the second limit wavelength preferably differ from one another.

If the selection device, i.e., the switchable element, is embodied as a dichroic wedge and if different splitter layers are applied to the front side and the back side, different locations on the manipulation element can be illuminated for different wavelengths. This is possible independently of whether the manipulation element is situated in a pupil plane or an intermediate image plane. If the manipulation element is situated in an intermediate image plane, this is also referred to as the field being influenced or manipulated.

The separation of the wavelength ranges is dependent on a wedge angle and a focal length of an optical unit associated with the manipulation element. This achieves the object of being able to influence excitation and detection light differently using one adaptive element. Here, the selection device, the wedge in this example, can be positioned both in a collimated region and in a divergent or convergent region of the illumination beam path. This is a decisive advantage since the influence of the spatial phase of the light is strongly dependent on the wavelength of the light. In particular, this therefore facilitates the use of dyes with a large Stokes shift if both excitation and emission are intended to be manipulated.

An apparatus that is adaptable to different problems in particularly variable fashion can be obtained if an angle position of the selection device, in particular of the double mirror or of the color splitter, is adjustable.

What may additionally be advantageous in this context is if the selection device has a plurality of different color splitters and/or mirrors.

Such an apparatus is particularly easy to handle if the color splitters and/or mirrors are arranged on a splitter wheel and are selectively positionable in the illumination beam path. It is possible to switch between very different modes of operation very quickly and easily if different color splitters and mirrors are arranged on a splitter wheel. Position tolerances of the splitters play a subordinate role in this case since the light is always reflected twice. Hence, position errors are compensated automatically.

What is important, as a matter of principle, for the optical elements that influence the beam path in the additional optical section is that the light is guided as desired and that at least one pupil plane and/or at least one intermediate image plane is formed. Particularly preferably, the optical elements that influence the beam path have at least one lens group, in particular at least one lens.

Moreover, it is advantageous if a position of a beam engagement, in particular a reflection engagement, of the selection device lies away from an optical axis of the at least one lens group. Such positioning allows arrangements that can be adapted to new applications without much outlay.

In further variants of the invention, the optical elements that influence the beam path can comprise at least one mirror. Thus, it is possible to realize apparatuses with a comparatively small installation size.

In a particularly preferred variant, a first lens group and a second lens group are present in the additional optical section. In particular, a first pupil plane and a second pupil plane can be formed in that case. Here, the first lens group and/or the second lens group can consist of respectively one lens, in particular a color corrected lens.

A further advantageous variant, in which a focal length of the first lens group differs from a focal length of the second lens group, is possible if two lenses or two lens groups are used instead of only one lens or one lens group. Then, a size of the pupil can be set in targeted fashion by choosing the ratio of the focal lengths of the first and the second lens or lens group. This may be expedient for adapting the size of the pupil to a certain available manipulation element, for example a certain spatial light modulator (SLM).

Expediently, the first lens group and the second lens group can be positioned relative to one another in such a way that an optical axis of the first lens group coincides with an optical axis of the second lens group. As a result, a comparatively symmetric structure is obtained, which can be adapted to modified use geometries without much outlay. In this respect, it is also particularly advantageous if the at least one lens group, in particular the first lens group and the second lens group, is/are passed through twice by the excitation light, in particular in opposite directions. Odd aberrations, such as distortion and coma, can be compensated by the twofold passage through the optical unit.

In principle, transmitting adaptive element on the basis of liquid crystals can be used as manipulation elements in one of the additional pupils. Reflecting adaptive elements, for example in the form of membrane mirrors, are often used in the actuation on account of their shorter reaction times, a highly flexible membrane being deformed in said membrane mirrors by means of piezo-elements or by electrostatic forces. Likewise, micromirror arrays, in particular, can be used.

The use of a so-called SLM (spatial light modulator) may also be advantageous. Using the latter, the desired spectral components can be influenced in such a way that they are steered to the imaging sensor. Moreover, so-called DMDs (digital mirror devices) or else MEMSs (micro-electromechanical systems) with a light guiding function are usable here.

Thus, advantageous variants of the apparatus according to the invention are distinguished in that an SLM (spatial light modulator), a DMD (digital mirror device) and/or a MEMS (micro-electromechanical system) is/are positioned in at least one of the additional pupil planes and/or one of the additional intermediate image planes.

In further variants, a Damann grating can be positioned in at least one of the additional pupil planes and/or one additional intermediate image plane.

For certain applications, e.g., for structured illumination, an intermediate image plane being formed the additional optical section and a manipulation element being positioned in the intermediate image plane may also be preferable. By way of example, a device for light modulation, in particular a transmitting device for light modulation, may be present in the intermediate image plane. By way of example, this device may be a phase grating for structured illumination.

Furthermore, an intermediate image plane may also be formed in the additional optical section, an adaptive element, in particular an SLM, being positioned in said intermediate image plane for the purposes of beam shaping of the excitation light. By way of example, this renders it possible for certain spots to be shown or masked in a multi-spot illumination.

In the case of applications for multi-spot scanning microscopy, it may moreover be advantageous for at least one multi-lens arrangement to be positioned in the illumination beam path and/or in a detection beam path, particularly in the additional optical section.

By way of example, this could realize arrangements in which one and the same detection pinhole is used for the detection light that can be traced back to the different illuminated sample locations.

Further advantageous variants of the invention relate to the use of the apparatus for unpolarized light, e.g., in detection.

This problem is based on the assumption that known SLMs (LCoS) (SLM=spatial light modulator, LCoS=liquid crystal on silicon) only work for one polarization direction and that SLMs working on a polarization-independent basis will hardly be commercially available at this time. Thus, if the intention is to use the apparatus according to the invention profitably in detection, it is necessary to ensure that both polarization components (s and p) are treated effectively. Two options arise to this end for the apparatus proposed in the application.

In a first option, a first pupil plane and a second pupil plane are formed in the additional optical section, wherein a first spatial light modulator is arranged in the first pupil plane and a second spatial light modulator is arranged in the second pupil plane.

Thus, the apparatus generates two pupils in this first option, it being possible to design said pupils in such a way that an SLM can be placed in each of the two pupils.

Thereupon, in the first option, an effective axis of the first spatial light modulator (SLM) can be arranged at an angle that differs by 90 degrees in comparison with an effective axis of the second spatial light modulator (SLM) relative to a polarization direction of light in the illumination beam path and/or the detection beam path.

Thus, the two SLMs are used with a 90-degree rotation in relation to one another in respect of their effective axis.

Alternatively, a polarization rotation device for rotating a polarization direction of the light in the illumination beam path and/or the detection beam path can also be present upstream of the first spatial light modulator (SLM) or upstream of the second spatial light modulator (SLM).

By way of example, such a rotation of polarization can be implemented by wave plates, in particular lambda/2 plates.

In a second option for effectively treating both polarization components (s and p), a device for polarization-dependent splitting of the illumination beam path and/or of the detection beam path is present in the additional optical section and, moreover, optical means are present for guiding the split components of light of the illumination beam path and/or the detection beam path with different polarizations onto two different spatial light modulators or onto different regions of one and the same spatial light modulator in a pupil plane in the additional optical section.

Particularly preferably, the selection device can be configured for polarization-dependent splitting of the illumination beam path and/or of the detection beam path.

Figure 2:
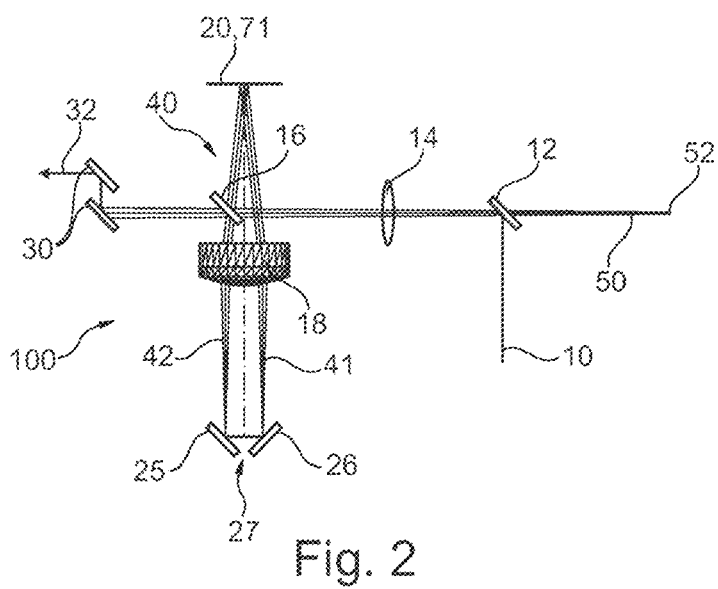
Figure 3:
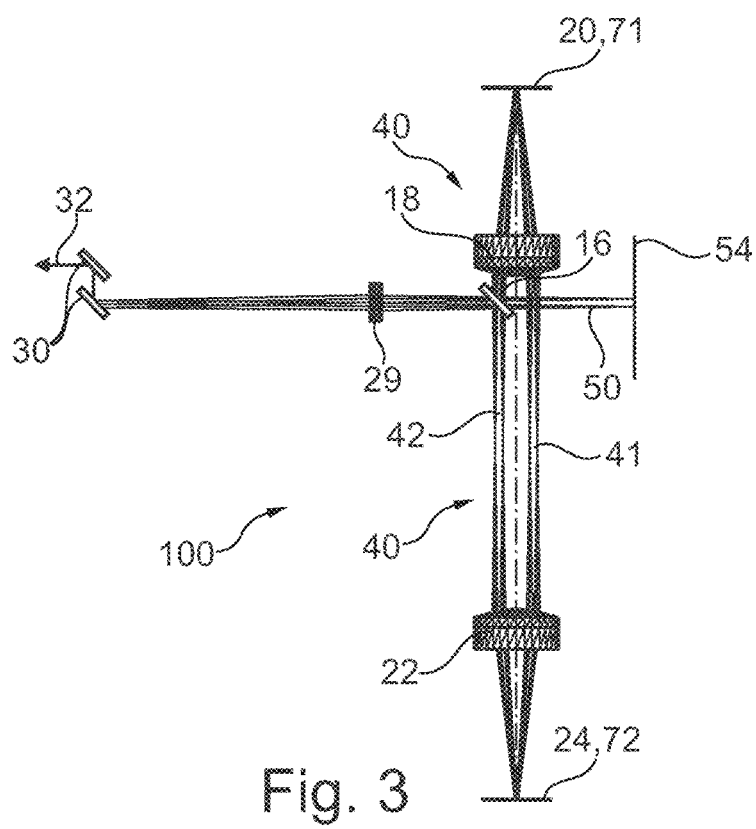
Figure 4:
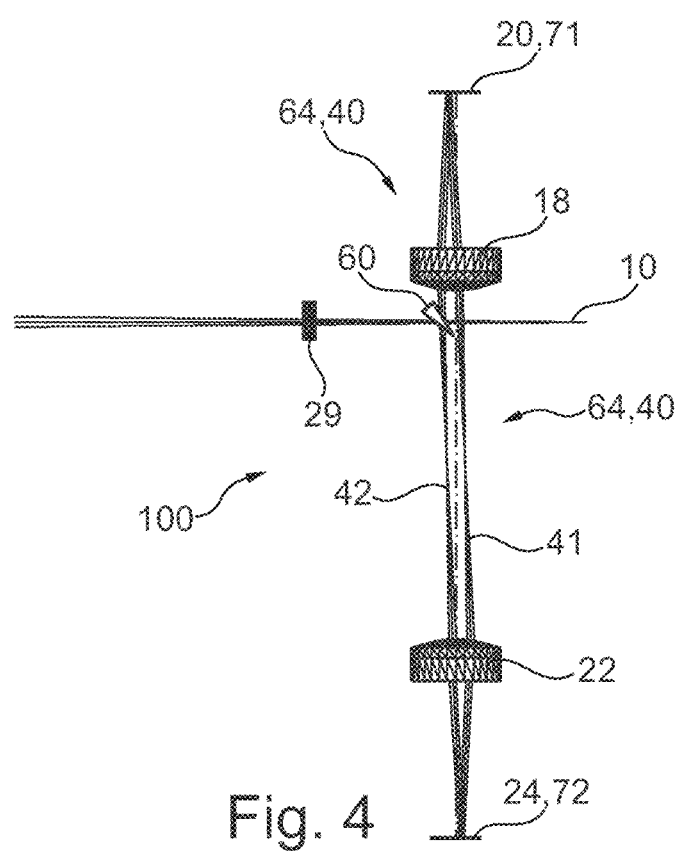
Figure 5:
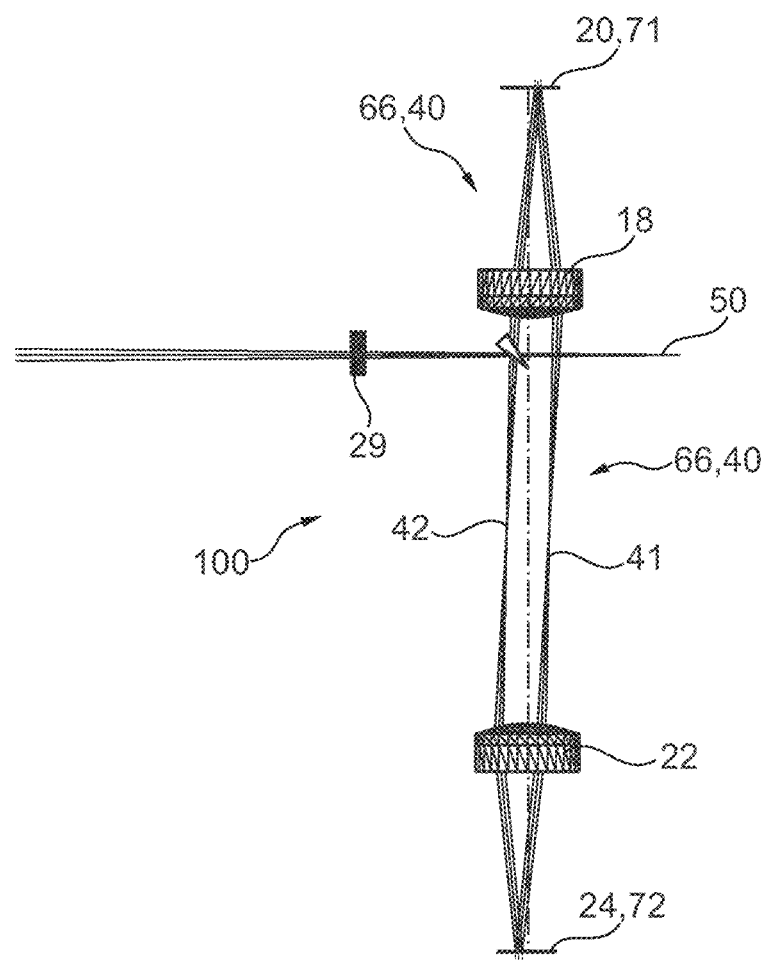
Figure 6:
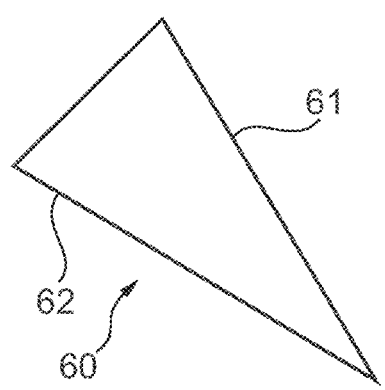

Further advantages and features of the invention will be described below with reference to the figures. In the figures:

FIG. 1: shows a schematic view of a first exemplary embodiment of an apparatus according to the invention;

FIG. 2: shows a schematic view of a second exemplary embodiment of an apparatus according to the invention;

FIG. 3: shows a schematic view of a third exemplary embodiment of an apparatus according to the invention;

FIG. 4: shows a first schematic view of a fourth exemplary embodiment of an apparatus according to the invention;

FIG. 5: shows a second schematic view of the exemplary embodiment of FIG. 4; and FIG. 6: shows a schematic view of a detail of the exemplary embodiment of FIG. 4.

A first exemplary embodiment of an apparatus 100 according to the invention for beam manipulation for a scanning microscope is explained with reference to FIG. 1. Identical components and components having an equivalent effect are generally denoted by the same reference signs in the figures.

The apparatus 100 schematically illustrated in FIG. 1 initially has a principal color splitter 12, an illumination beam path 13 and a scanner 30 as essential components. The principal color splitter 12 serves to couple excitation light 10 into the illumination beam path 13 and to separate excitation light 10 from detection light 50. The scanner, which is preferably positioned in a pupil plane, serves to scan the excitation light 10 in a manner known in principle. The apparatus 100 can further include a switching device 11 for activating and deactivating the excitation light 10, in particular an acousto-optic or electro-optic switch, such as a Pockels cell, which is shown as being present in the illumination beam path 13, upstream of the principal color splitter 12.

According to the invention, an additional optical section 40 is present, comprising optical elements 14, 16, 71, 18, 22, 72 that influence a beam path and are described in detail below. According to the invention, a first pupil plane 20 and a second pupil plane 24 are formed by the optical elements 14, 16, 71, 18, 22, 72 that influence the beam path 13.

Furthermore, an adjustable selection device 16 is present according to the invention for the purposes of connecting or disconnecting the additional optical section 40, with the selection device 16 being positioned outside of pupil planes of the illumination beam path 13.

In the shown example, the selection device 16 is a double mirror, which can be pulled out of the beam path with the aid of a mechanism 17. If the double mirror is pulled out of the beam path, the additional optical section 40 is disconnected and both excitation light 10 and detection light 50 returning from the scanner 30 pass on a direct route between the principal color splitter 12 and the scanner (via a lens 14). The mechanism 17 can be configured to pivot and/or push the selection device 16 into and out of the beam path. In an embodiment, the selection device 16 can be one of a plurality of different color splitters and/or mirrors. In this case, the mechanism 17 can be a splitter wheel which is configured to selectively position one of the color splitters and/or mirrors arranged thereon in the beam path to operate as the selection device 16.

The optical elements that influence the beam path 13 initially contain a lens 14 for collimating the excitation light 10 in the sequence of the beam path of the excitation light 10, which is elucidated by arrows in FIG. 1. Subsequently, the excitation light 10 is incident on a front side of the double mirror 16 and is deflected from there transversely upwardly in the direction of a first pupil plane 20. A first reflecting manipulation element 71 is positioned in the first pupil plane 20, this element 71 being able to be an SLM, for example, for targeted manipulation of the excitation light 10. By way of example, certain desired beam profiles of the PSF can be set.

The excitation light 10 is reflected by the first manipulation element 71 and, still in the form of a collimated beam, said excitation light reaches the lens 18. The lens 18 guides the excitation light 10 along a first beam path 41 of the additional optical section 40 to a lens 22. As is evident from FIG. 1, the optical axes of the lenses 18 and 22 coincide. The lens 22 re-collimates the incident excitation light 10 and guides the latter to a further pupil plane 24, in which a reflecting manipulation element 72 such as an SLM may likewise be positioned. Further desired manipulations of the excitation light 10 can be undertaken in the further pupil plane 24. The excitation light 10 is radiated back from the reflecting manipulation element 72 in the direction of the lens 22 and said excitation light is guided by the latter to the lens 18 on a second beam path 42 of the additional optical section 40. As is evident from FIG. 1, both the first beam path 41 and the second beam path 42 lie away from the optical axes of the lenses 18 and 22.

In principle, it is sufficient for only one reflecting manipulation element, such as one SLM, for example, to be present. By way of example, it may also be the case that a simple mirror is arranged in the first pupil plane 20 and a reflecting manipulation element, such as an SLM, for example, is arranged in the further pupil plane. The reverse arrangement is likewise possible, i.e., a reflecting manipulation element, such as an SLM, for example, in the first pupil plane and a simple mirror in the further pupil plane.

The lens 18 re-collimates the excitation light 10 coming from the lens 22 and guides said excitation light to a back side of the double mirror 16. From here, the excitation light 10 is finally guided in the direction of the scanner 30 and, from there, in the direction of a microscope not shown in FIG. 1.

In the example of FIG. 1, intermediate image planes are also formed between the lenses 18 and 22; however, these are not used in this embodiment variant.

If use is made of a double mirror, detection light 50 coming from the microscope can adopt the same optical path as the excitation light 10, albeit in a reverse direction. A separation would only occur at the principal color splitter 12, if the detection light 50 has a different wavelength.

In a preferred variant, the selection device 16 is a color splitter which, for example, reflects excitation light 10 at both the front side and back side but allows detection light 50 to pass at the front side and back side. Then, the path of the excitation light 10 remains unchanged, but the detection light 50, coming from the scanner 30, is transmitted through the selection device 16 and directly reaches a detection pinhole 52 via the principal color splitter 12.

The first manipulating, in particular adaptive, optical element 71 and/or the second adaptive optical element 72 have/has a reflective embodiment, for example, and can serve for axial positioning (z-positioning) of the laser spots in relation to the optical axis and for compensating aberrations at the respective x, y, z-position of the laser spots in the sample. To this end, said element(s) may have a membrane with, e.g., a radially symmetrically deformable mirror surface and may be connected to an actuation device (not illustrated in the drawing), which in turn is connected to a controller for specifying a temporally and spatially defined sequence of x, y, z-positions of the laser spots.

For the purposes of closed-loop control of the aberration compensation, the actuation device can preferably be coupled to a measuring device for capturing aberrations caused by system and object at the respective x, y, z-positions, said measuring device being equipped with a wavefront sensor. In an alternative embodiment, in which the aberration compensation is controlled on the basis of system-related error data stored in advance, the actuation device is connected to an actual value memory for aberrations at certain x, y, z-positions (not illustrated in the drawing).

Thus, a switchable color splitter 16 or a mirror may be situated in the beam path in the variant shown in FIG. 1. Then, the excitation light 10 adopts the path that is illustrated in FIG. 1 and described above. If the selection device 16 is not situated in the beam path (like in the case of the double mirror) or is not effective (like in the case of a color splitter), then the light does not pass over the adaptive path, i.e., the additional optical section 40, but instead simply runs straight ahead.

Moreover, the example of FIG. 1 is distinguished by virtue of two additional pupil planes 20, 24 being formed in the additional optical section 40. Here, the size of the pupil in the pupil plane 24 can be set by the ratio of the focal lengths of the lenses 18 and 22.

In an alternative, in which the apparatus is used for unpolarized light, e.g., in the detection, the polarization components of the detection light can be split with the selection device 16 in FIG. 1 such that both polarization components reach different spatial regions of one and the same SLM (spatial light modulator) in the pupil 24/72. Before this, one of the polarization components is rotated through 90°, for example using a lambda/2 plate. Hence, both polarization components can ultimately be influenced by the same SLM.

Variants of the apparatus 100 according to the invention are illustrated below with reference to FIGS. 2 to 6, wherein, in essence, the differences are explained and components and modes of action which are the same as in FIG. 1 are not described again.

A second exemplary embodiment of an apparatus 100 according to the invention for beam manipulation for a scanning microscope is explained with reference to FIG. 2. In comparison with the example of FIG. 1, the lens 22 has been replaced by two reflecting elements 25 and 26 in this variant. As a result, a design that is shortened overall is obtained, which may be advantageous in view of the required installation space.

One of the two reflecting elements 25 and 26, which may also be referred to as deflection mirrors, can be positioned in an intermediate image plane and can be embodied as an adaptive mirror, by means of which beam shaping, of the excitation light 10, for example, is possible. However, in principle, it is also possible for an intermediate image plane 27 to be formed in symmetric fashion between the two reflecting elements 25 and 26. A transmitting manipulation unit, e.g., a phase mask for structured illumination, can be positioned in the intermediate image plane 27.

In the case of FIGS. 1 and 2, the first beam portion is part of the divergent beam path between the lens 14 and the scanning mirror 30, which is dislodged by the mirror 16, i.e., not passed through, if said mirror is pushed into the beam path. It is immediately evident from FIGS. 1 and 2 that there is no pupil in this part of the beam path.

A third exemplary embodiment of an apparatus 100 according to the invention for beam manipulation for a scanning microscope is explained with reference to FIG. 3. In comparison with the example of FIG. 1, the selection device 16 (e.g., a color splitter) is arranged in a convergent part of the beam path in this variant. Moreover, to this end, the selection device 16 has a different arrangement relative to the lenses 18, 22 in comparison with FIG. 1; specifically, it is arranged between said lenses 18, 22. This may be advantageous depending on installation space conditions. In comparison with FIG. 1, a lens 29 for collimating the beam is additionally present between the scanner 30 and the selection device 16. Moreover, this exemplary embodiment shows an application for a multi-spot operation, in which a certain field is propagated by the apparatus. Here, the detection light 50 is ultimately incident on a multiple pinhole 54 or on a sensor that is pixelated in areal fashion (SPAD array or the like).

A fourth exemplary embodiment of an apparatus 100 according to the invention for beam manipulation for a scanning microscope is finally explained with reference to FIGS. 4 to 6.

Here, the selection device is formed by a color splitter wedge 60 with certain properties. The color splitter wedge 60, which is shown schematically in FIG. 6, has a front side 61, which is embodied to reflect light with wavelengths that are shorter than a first limit wavelength. Moreover, the color splitter wedge 60 has a back side 62, which is embodied to reflect light with wavelengths that are longer than a second limit wavelength. Here, the second limit wavelength should be longer than the first limit wavelength. However, the converse case is also conceivable.

On account of the different reflection angles for the front side 61 and the back side 62 caused by the wedge form, these properties of the color splitter wedge 60 cause light with different wavelengths to pass through the additional optical section 40 along different paths. By way of example, this can be used to guide excitation light with a shorter wavelength along a different path through the additional optical section 40 than detection light with a shorter wavelength. In particular, this also leads to light of different wavelengths being incident at different locations on the pupil planes 20, 24 and accordingly being able to be manipulated differently at said locations.

By way of example, FIG. 4 shows a beam path for excitation light 10 coming from the principal beam splitter 12. In this example, said excitation light should be reflected only at the front side 61 of the color splitter wedge 60, but should be transmitted by the back side 62. Then, the excitation light 10 adopts the path 64 that is illustrated in FIG. 4.

Detection light 50 coming from the microscope takes a different path, as shown schematically in FIG. 5. In this example, said detection light should be reflected only at the back side 62 of the color splitter wedge 60, but should be transmitted by the front side 61. Then, the detection light 50 adopts the path 66 that is illustrated in FIG. 5. The substantial reason for the different paths lies in the respectively different reflection angle for the front side 61 and the back side 62 of the color splitter wedge 60, which is caused by the wedge form. As is evident from FIGS. 4 and 5, the detection light 50 is incident on the pupil planes 20, 24 at different locations in comparison with the excitation light 10 and hence said detection light can be manipulated differently by the spatially dependent manipulation means (e.g., SLMs) situated there.

A further useful aspect of the invention relates to the exploitation of the light polarization at the position of the selection device 16, for example in FIG. 1. As a rule, the excitation light is very well polarized while the emission light from the sample has no preferred polarization. Now, an important application consists in the excitation light being intended to be guided via the SLM for manipulation purposes, the latter producing a certain point pattern in the sample, for example. However, the intention now is to very quickly switch back to imaging. This is possible by virtue of introducing, e.g., an electro-optic switch, such as a Pockels cell, for example, into the illumination beam path (e.g., into the path 10). Fast switching there then allows switching between the various paths, and hence switching between the modes, in the region of less than one millisecond. Then, it is very particularly advantageous if an element is introduced at this point 16, said element actually being a dichroic beam splitter with a defined edge function. It is known that the s-polarized and p-polarized components have a different behavior in these dichroic beam splitters. By way of example, such a dichroic beam splitter with a defined edge function may have the following specifications:

$T_s(488\ nm) < 2\%$ $T_s(500\text{-}600\ nm) > 90\%$
$T_p(488\ nm) > 90\%$ $T_p(500\text{-}600\ nm) > 90\%$ Here, $T_s(x)$ is the transmission coefficient of the radiation with s-polarization and a wavelength x. Accordingly, $T_p(x)$ is the transmission coefficient of the radiation with p-polarization and a wavelength x. Thus, using such a dichroic beam splitter, it is possible to switch the laser with a wavelength of 488 nm in a polarization-dependent manner, while the emission light of the sample in the range of 500-600 nm is transmitted for all polarization components.

Instead of being designed as a color splitter, the wedge 60 may also be designed in such a way that the front side and the back side reflect the respectively different polarization components at a different angle in each case, which, entirely analogously to the color wedge 60, leads to the polarization components being incident on different spatial regions of the SLM. The components cannot be merged again without losses after the wavefront has been influenced by the SLM. It is possible, in principle, to guide the two polarization components together to a detector. However, the polarization components are preferably guided to detectors and detected in separated fashion.

LIST OF REFERENCE SIGNS

10 Excitation light
12 Principal color splitter

14 Lens
16 Selection device
18 Lens
20 Pupil plane
22 Lens
24 Pupil plane
25 Mirror
26 Mirror
27 Intermediate image plane
29 Lens
30 Scanning mirror
32 Optical path to the microscope
40 Additional optical section
41 Beam path from the first lens 18 to the second lens 22
42 Beam path from the second lens 22 to the first lens 18
50 Detection light
52 Pinhole plane
54 Pinhole plane
60 Wedge-shaped color splitter
61 Upper side of the wedge-shaped color splitter
62 Lower side of the wedge-shaped color splitter
64 Beam path for a first wavelength
66 Beam path for a second wavelength
71 First adaptive element, in particular SLM
72 Second adaptive element, in particular SLM
100 Apparatus

The invention claimed is:

1. An apparatus for beam manipulation for a scanning microscope, the apparatus comprising:
a principal color splitter for coupling excitation light into an illumination beam path and for separating excitation light from detection light of a detection beam path, a scanner for scanning the excitation light,
an additional optical section, the additional optical section comprising optical elements that influence a beam path,
wherein at least one of: one pupil plane, one intermediate image plane, a plurality of pupil planes, or a plurality of intermediate image planes, is formed in the additional optical section by way of the optical elements that influence the beam path,
an adjustable selection device comprising a switching device and a reflecting device, wherein the switching device is configured to variably activate either the additional optical section or a first beam portion for at least one of at least a portion of the illumination light or at least a portion of the detection light, wherein the reflecting device includes a reflecting layer,
wherein the first beam portion of at least one of the illumination or the detection beam path contains no pupil plane of the illumination and the detection beam path,
wherein portions of at least one of the illumination light or the detection light for which the additional optical section is activated are reflected both at a front surface and a back surface of the reflecting layer,
wherein portions of the illumination light and/or the detection light for which the first beam portion is active are at least one of: transmitted through the reflecting layer or uninfluenced by the reflecting layer, and
wherein, in addition to the reflections at the reflecting device, the whole beam within the additional optical section is reflected at least twice further within the additional optical section.

2. The as claimed in claim 1,
wherein the scanner is positioned in a pupil plane.

3. The apparatus as claimed in claim 1,
wherein the reflecting device is positioned in a collimated region of at least one of the illumination or the detection beam path.

4. The apparatus as claimed in claim 3,
wherein the reflecting device is positioned in a divergent or convergent region of at least one of the illumination or the detection beam path.

5. The apparatus as claimed in claim 1,
wherein the switching device comprises mechanical means for pivoting the reflecting device into and out of at least one of the illumination or the detection beam path or for pushing the reflecting device into or out of at least one of said illumination or said detection beam path.

6. The apparatus as claimed in claim 1,
wherein an angle position of the reflecting device is adjustable.

7. The apparatus as claimed in claim 1,
wherein the reflecting layer comprises at least one color splitter.

8. The apparatus as claimed in claim 1,
wherein the switching device is configured to activate and deactivate the excitation light located in the illumination beam path, and wherein the reflecting layer is embodied as a polarization filter with a wavelength-dependent effect.

9. The apparatus as claimed in claim 1,
wherein the illumination beam path is subdivided into a plurality of partial beams, the apparatus further comprising polarization-rotating elements for providing different polarizations, wherein at least one polarization rotating element is located in the beam path of each of the partial beams, and
wherein the switching device is configured to switch between one or more of the partial beams.

10. The apparatus as claimed in claim 1,
wherein the reflecting layer comprises at least one wavelength-dependent dichroic polarization filter.

11. The apparatus as claimed in claim 1,
wherein the reflecting device has at least one of: a plurality of different color splitters or a plurality of mirrors.

12. The apparatus as claimed in claim 11,
wherein at least one of: the plurality of different color splitters or the plurality of mirrors, are arranged on a splitter wheel and are selectively positionable in at least one of the illumination or the detection beam path.

13. The apparatus as claimed in claim 1,
wherein a position of a beam engagement of the reflecting device lies away from an optical axis of at least one lens group.

14. The apparatus as claimed in claim 1,
wherein a first pupil plane and a second pupil plane are formed in the additional optical section with the aid of a first lens group and a second lens group.

15. The apparatus as claimed in claim 14,
wherein a focal length of the first lens group differs from a focal length of the second lens group.

16. The apparatus as claimed in claim 14,
wherein an optical axis of the first lens group coincides with an optical axis of the second lens group.

17. The apparatus as claimed in claim 14,
wherein at least one of: the first lens group or the second lens group, is passed through twice by the excitation light.

18. The apparatus as claimed in claim 14,
wherein at least one of: the first lens group or the second lens group, is passed through twice by the excitation light in opposite directions.

19. The apparatus as claimed in claim 1,
wherein at least one of an SLM (spatial light modulator), a DMD (digital mirror device), or a MEMS (microelectromechanical system) is positioned in at least one of the additional pupil planes.

20. The apparatus as claimed in claim 1,
wherein a Damann grating is positioned in at least one of the additional pupil planes.

21. The apparatus as claimed in claim 1,
wherein an intermediate image plane is formed in the additional optical section and
wherein a device for light modulation is positioned in the intermediate image plane.

22. The apparatus as claimed in claim 1,
wherein an intermediate image plane is formed in the additional optical section, an adaptive element being positioned in said intermediate image plane for the purposes of beam shaping of the excitation light.

23. The apparatus as claimed in claim 1,
wherein at least one multi-lens array is positioned in at least one of the illumination beam path or a detection beam path.

24. The apparatus as claimed in claim 1,
wherein at least one multi-lens array is positioned in at least one of the illumination beam path or a detection beam path in the additional optical section.

25. The apparatus as claimed in claim 1,
wherein the reflecting device comprises at least one wedge-shaped color splitter,
wherein a front side of the wedge-shaped color splitter is embodied to reflect light at wavelengths that are longer or shorter than a first limit wavelength and
wherein a back side of the wedge-shaped color splitter is embodied to reflect light at wavelengths that are longer or shorter than a second limit wavelength.

26. The apparatus as claimed in claim 1,
wherein a first pupil plane and a second pupil plane are formed in the additional optical section and
wherein a first spatial light modulator (SLM) is arranged in the first pupil plane
and a second spatial light modulator (SLM) is arranged in the second pupil plane.

27. The apparatus as claimed in claim 26,
wherein an angle at which an effective axis of the first spatial light modulator (SLM) is arranged to a polarization of light in the illumination beam path and/or the detection beam path differs by 90 degrees in comparison to an angle at which an effective axis of the second spatial light modulator (SLM) is arranged to said polarization.

28. The apparatus as claimed in claim 26,
wherein a polarization rotation device for rotating a polarization direction of the light is present in at least one of the illumination beam path or the detection beam path upstream of the first spatial light modulator (SLM) or upstream of the second spatial light modulator (SLM).

29. The apparatus as claimed in claim 1,
further comprising:
a device for polarization-dependent splitting of at least one of the illumination beam path or the detection beam path in the additional optical section, and
at least one of a lens or a mirror, for guiding the split components of light of at least one of the illumination beam path or the detection beam path with different polarizations onto two different spatial light modulators or onto different regions of one and the same spatial light modulator in a pupil plane in the additional optical section.

30. The apparatus as claimed in claim 1,
wherein the selection device is configured for polarization-dependent splitting of at least one of the illumination beam path or the detection beam path.

31. A microscope comprising:
an apparatus for beam manipulation as claimed in claim 1,
at least one microscope objective, and
a detector device for detecting detection light emitted by a sample,
wherein the pupil planes of the additional optical section are situated in planes that are optically conjugate to a pupil plane of the microscope objective.

32. The apparatus according to claim 1,
wherein the reflecting layer is a first reflecting layer,
wherein the reflecting device has a second reflecting layer which is tilted with respect to the first reflecting layer,
wherein light reflected at the second reflecting layer is guided through the additional optical section along a different path than light reflected at the first reflecting layer, wherein at least a portion of the excitation light for which the additional optical section is activated is reflected both at a front surface and a back surface of one of the first and the second reflecting layers and is at least one of transmitted through the other one of the first and the second reflecting layers or uninfluenced by the other one of the first and the second reflecting layers,
wherein at least a portion of the detection light for which the additional optical section is activated is reflected both at a front surface and a back surface of the other one of the first and the second reflecting layers and is at least one of transmitted through the one of the first and the second reflecting layers or uninfluenced by the one of the first and the second reflecting layers,
wherein portions of the illumination light and/or the detection light for which the first beam portion is active are at least one of transmitted through the second reflecting layer or uninfluenced by the second reflecting layer.

* * * * *